Dec. 22, 1942.                C. BELSKY                2,305,918
                            MOTOR VEHICLE
                         Filed Jan. 16, 1942
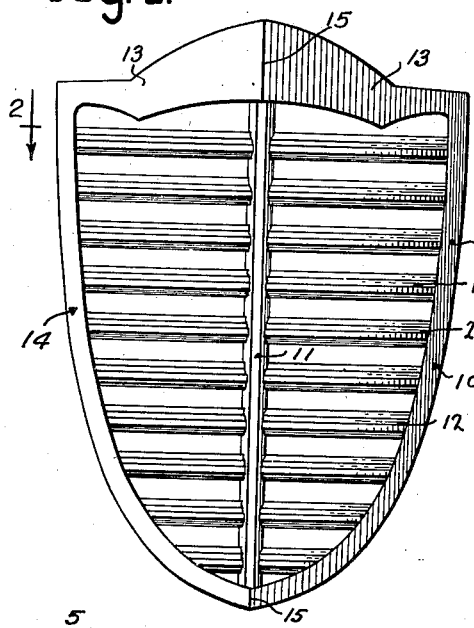
Fig. 1.
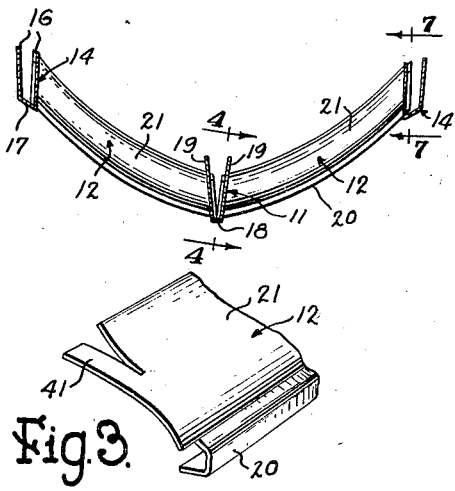
Fig. 2.
Fig. 3.
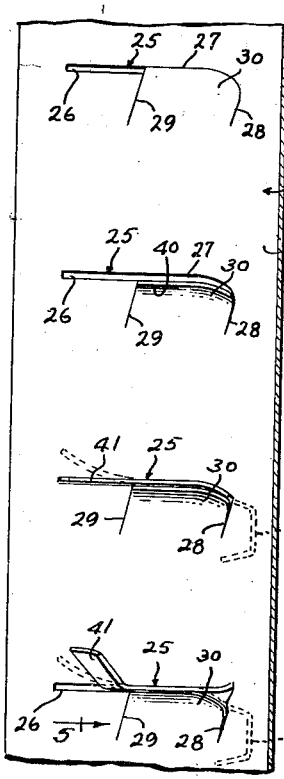
Fig. 4.    Fig. 5.
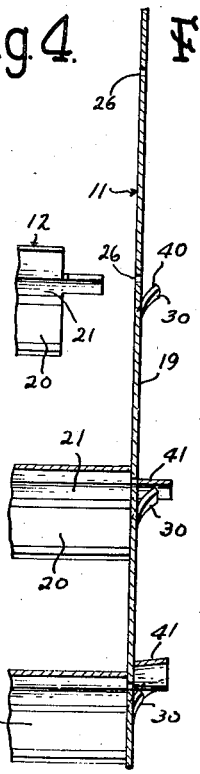
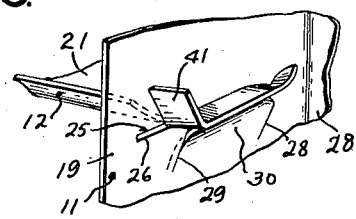
Fig. 6.
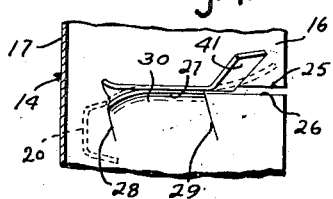
Fig. 7.
INVENTOR.
CHARLES BELSKY
BY
    Tibbetts + Hart
        Attorneys Patented Dec. 22, 1942

2,305,918

UNITED STATES PATENT OFFICE 2,305,918

MOTOR VEHICLE

Charles Belsky, Detroit, Mich., assignor to Packard Motor Car Company, Detroit, Mich., a corporation of Michigan Application January 16, 1942, Serial No. 426,975

7 Claims. (Cl. 189—82)

This invention relates to sheet metal structures and more particularly to radiator grilles for motor vehicles.

An object of the invention is to provide a sheet metal device in which members are securely fastened together by interengaging portions thereof.

Another object of the invention is to provide a sheet metal grille for motor vehicles in which louvers are assembled with a frame by interlocking portions thereof.

Another object of the invention is to form a sheet metal grille for motor vehicles by projecting end portions of louvers through openings in a frame and securely interlocking them without the use of extraneous securing means.

A further object of the invention is to secure louvers with a grille frame by interlocking connections that are hidden from the exterior.

Other objects of the invention will appear from the following description taken in connection with the drawing, which forms a part of this specification, in which:

Fig. 1 is a front elevational view of a sheet metal grille constructed in accordance with the invention;

Fig. 2 is a sectional view of the grille taken on line 2—2 of Fig. 1;

Fig. 3 is a perspective view of one end of a louver fabricated for assembly with the grille frame;

Fig. 4 is a fragmentary sectional view of the grille taken on line 4—4 of Fig. 2 showing the frame and louvers in various stages of assembly;

Fig. 5 is a fragmentary sectional view of the grille taken on line 5—5 of Fig. 4;

Fig. 6 is a rear perspective view of one end of a louver interlocked with the grille frame;

Fig. 7 is a fragmentary sectional view of the grille taken on line 7—7 of Fig. 2 showing an interlocking connection between a louver and one side of the grille frame.

The invention can be incorporated with sheet metal structures of various kinds and for the purpose of illustration a motor vehicle grille has been selected. The grille is composed essentially of a frame 10, of desired outline, and a plurality of horizontally extending louver members 12. The frame is preferably divided by a vertically extending member 11 and the louvers are arranged to extend horizontally between member 11 and the frame. The frame, division member and the louvers are formed of stiff sheet metal of desired cross-sectional shape.

The frame can be formed of two mating sections each having a top 13 and a side 14, such sections being joined at the top and bottom as indicated by lines 15 in some suitable manner such as welding. The sides are preferably U-shaped in cross section with legs 16 trailing rearwardly from face 17. The division member is suitably fixed at its ends to the frame and has a nose 18 with rearwardly diverging sides 19. The louvers are each formed with a front nose 20 and from the upper portion of the nose a wing 21 flares outwardly in convex and then in concave form, such wings extending upwardly and rearwardly when the louvers are assembled with the frame.

The louvers can be secured to the frame and division member entirely by interlocking connections that are hidden from view when looking at the exterior of the grille in its assembled position on a motor car. The sides of the division member and the inner legs of the frame sides are formed with aligned openings 25 for receiving end portions of the louver wings. These openings are formed by slotting the metal horizontally as indicated by numeral 26 and by shearing the metal forwardly from the slot in a horizontal direction forming base slits 27. Leg slits 28 and 29 are sheared from the ends of the slits 27 and extend substantially normal thereto, the forward ends of slits 27 curving into slits 28. The slits 27, 28 and 29 provide tabs 30 which are turned out at their free end to make slits 27 the same width as the slots.

The ends of the louver wings 21 project a little beyond the ends of louver noses 20 and are sheared at their rear ends in alignment with the ends of the noses to form tongues 41. The openings in the inner legs of the sides of the frame correspond to the openings in the frame division member except that slot 26 extends to the rear end of the legs. The frame openings for the louvers are originally formed as shown at the top portion of Figs. 4 and 5. To prepare for the interengagement of the louvers and frame, the tabs 30 are bent out, as shown at 40 in Figs. 4 and 5, so that the slit 27 is widened to the width of slot 26 and the tongues 41 of the louvers are straightened out so that the ends of the wings are substantially the same in cross-sectional form as the openings 25. The ends of the louver wings are now projected through the openings until the ends of the noses and the concave ends of the wings adjacent the tongues bear against the legs 16 and the sides 19 as shown in Figs. 4 and 5 by the louver second from the bottom. Pressure is now applied against tabs 30 bending them tightly against the projecting portions of the wings and camming the wings forwardly so that the forward ends of the projecting portions of the wings are wedged into the curved junctions of slits 27 and 28 as illustrated by the bottom louver in Figs. 4 and 5. The forward ends and tongues of the projecting portions of the wings are next bent upwardly away from openings 25 so that they overlie the frame legs and division member sides and thereby further interlock the louvers to the frame, such forming being illustrated with the bottom louver in Figs. 4 and 5 and the louvers shown in Figs. 6 and 7.

Either one or both ends of the louvers can be securely fastened to the grille frame by the herein described interlocking engagement. The ends of the nose and the wings of the louvers overlie or completely fill the frame openings and, together with the projecting louver ends locked behind the frame, provides an arrangement whereby the openings are enclosed and the connections are shielded so that they can not be noticed from the exterior of the grille when mounted on a vehicle.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a sheet metal structure, a first member having a slot and a sheared base slit continuing from one end of the slot, said member also having sheared leg slits extending from the ends of the base slit to form a tab, the free end of said tab being bent outwardly to provide with the slot, an opening, and a second member having an end of substantially the same cross-sectional dimensions as the opening and inserted therethrough, said members being interlocked by pressing the tab against the projecting end of the second member with sufficient force to wedge an end thereof into the leg slit in the first member remote from the slot.

2. In a sheet metal structure, a first member having a slot and a sheared base slit continuing from one end of the slot, said member also having sheared leg slits extending from the ends of the base slit to form a tab, the free end of said tab being bent outwardly to provide with the slot, an opening, and a second member having an end of substantially the same cross-sectional dimensions as the opening and inserted therethrough, said members being interlocked by pressing the tab against the projecting end of the second member with sufficient force to wedge an end thereof into the leg slit in the first member remote from the slot and by pressing the projecting end of the wedged portion of the member away from the base slit.

3. In a sheet metal structure, a first member having a slot and a sheared base slit continuing from one end of the slot, said member also having sheared leg slits extending from the ends of the base slit to form a tab, the free end of the tab being bent outwardly to provide with the slot, an opening, and a second member having an end of substantially the same dimensions as the opening and inserted therethrough, said end of the second member being partially sheared to form a tongue, said members being interlocked by pressing the tab against the projecting end of the second member with sufficient force to wedge an end thereof into the leg slit in the first member remote from the slot and by bending the tongue outwardly from the opening.

4. In a sheet metal structure, a first member having a slot and a sheared base slit continuing from one end of the slot, said member also having sheared leg slits extending from the ends of the base slit forming a tab, the free end of the tab being bent out to provide, with the slot, an opening, and a second member having an end portion of substantially the same dimensions in cross-section as the opening and projecting therethrough, said projected end portion of the second member being partially sheared to form a tongue adjacent the slot, said members being interlocked by pressing the tab against the projecting end of the second member with sufficient force to wedge an end thereof into the leg slit remote from the slot, by bending the end of the second member beyond the wedged portion away from the slit, and by bending the tongue away from the slot.

5. In a sheet metal structure, a first member having a slot and a sheared base slit continuing from one end of the slot, said member also having sheared leg slits extending from the ends of the base slit forming a tab, the junction of the base slit and the leg slit remote from the slot being curved, the free end of said tab being bent out to provide, with the slot, an opening, and a second member having an end of substantially the same cross-sectional dimensions as the opening and projected therethrough, said members being interlocked by pressing said tab against said projecting end of said second member with sufficient force to cam a portion thereof around the curved junction of the slits and into the leg slit remote from the slot.

6. In a sheet metal grille structure, a vertically extending member having a front face and a rearwardly diverging side, said side having a punched horizontal slot, a sheared base slit continuing from the forward end of the slot and sheared leg slits at the ends of the base slit, said slits forming a tab having its free end bent rearwardly to open the base slit to the width of the slot, and a horizontally extending louver having a nose and a wing curving upwardly and rearwardly from the top of the nose, one end of said wing projecting beyond the adjacent end of the nose and sheared at the rear end in alignment with the end of the nose forming a tongue that is bent straight, the end of the wing being projected through the opening in the division member until the end of the nose and the curved end of the wing at the slit engage the front of the division member side and the tongue and the unsheared end of the louver being bent upwardly beyond the opening.

7. In a sheet metal grille, a frame having a sheet metal vertically extending division member formed with a nose and rearwardly diverging sides, said sides having horizontal slots therethrough, sheared base slits continuing forwardly from the slots and sheared leg slits extending downwardly from the ends of the base slits and, with the base slits, forming tabs that are bent rearwardly at their free ends, and a plurality of sheet metal louvers each having a nose and a curved upper wing extending rearwardly from the nose, an end of said wing extending beyond the adjacent end of said noses and having a sheared slit therein in alignment with but remote from the adjacent nose forming tongues, said ends of the wings being projected through the openings in the division member with the aligned curved end of the wings and the aligned noses bearing against the front of the division member, and the louvers being interlocked by bending the tongues away from the slots at the rear of the division member and by pressing the tabs forwardly against the projecting ends of the louvers, said louver noses and wings shielding the ends of the openings when viewed from the front of the grille.

CHARLES BELSKY.